United States Patent [19]

Ross

[11] 3,792,773

[45] Feb. 19, 1974

[54] APPARATUS AND METHOD FOR TREATING WASTE LIQUID

[75] Inventor: David S. Ross, Lorain, Ohio

[73] Assignee: Hydro-Clear Corporation, Avon Lake, Ohio

[22] Filed: Sept. 30, 1971

[21] Appl. No.: 185,059

[52] U.S. Cl.............. 210/42, 210/76, 210/82, 210/195, 210/265, 210/275
[51] Int. Cl............................................. B01d 41/02
[58] Field of Search............ 210/49, 76, 42, 79–82, 210/265, 274, 275–279, 195

[56] References Cited
UNITED STATES PATENTS

| 3,709,364 | 1/1973 | Savage | 210/275 X |
|---|---|---|---|
| 3,713,543 | 1/1973 | Heaney | 210/275 X |
| 3,617,539 | 11/1971 | Grutsch et al. | 210/82 X |
| 3,522,173 | 7/1970 | Lindman et al. | 210/49 |
| 3,613,888 | 10/1971 | Harris | 210/274 X |
| 3,428,177 | 2/1969 | Duff | 210/274 X |
| 3,557,955 | 1/1971 | Hirs et al. | 210/82 X |
| 3,545,619 | 12/1970 | Ettlich et al. | 210/265 X |
| 3,627,131 | 12/1971 | Goodman et al. | 210/82 |
| 3,630,892 | 12/1971 | Hirs et al. | 210/80 X |

*Primary Examiner*—Samih N. Zaharna
*Assistant Examiner*—Thomas G. Wyse
*Attorney, Agent, or Firm*—Meyer, Tilberry & Body

[57] ABSTRACT

An apparatus and method for treating waste effluent from a sewage treatment plant using a filter unit having a backwash arrangement, wherein the backwash liquid, after backwashing, is subjected to flocculation, coagulation and settlement to produce a supernatant and, then, introducing the supernatant directly into the inlet of the filter without returning the backwash liquid to the sewage treatment plant. The solids in the backwash liquid are concentrated and removed without being reintroduced into the sewage treatment plant.

44 Claims, 7 Drawing Figures

(AIR SYSTEM)

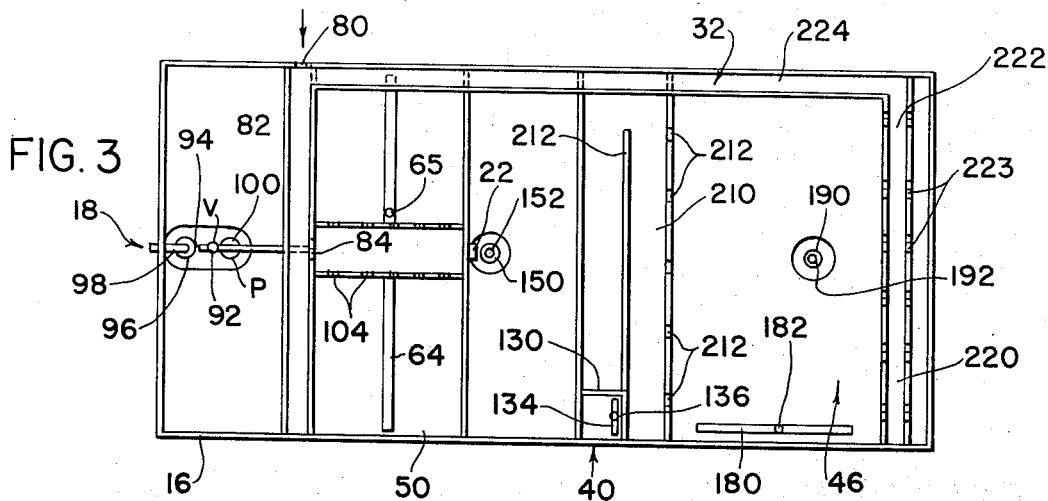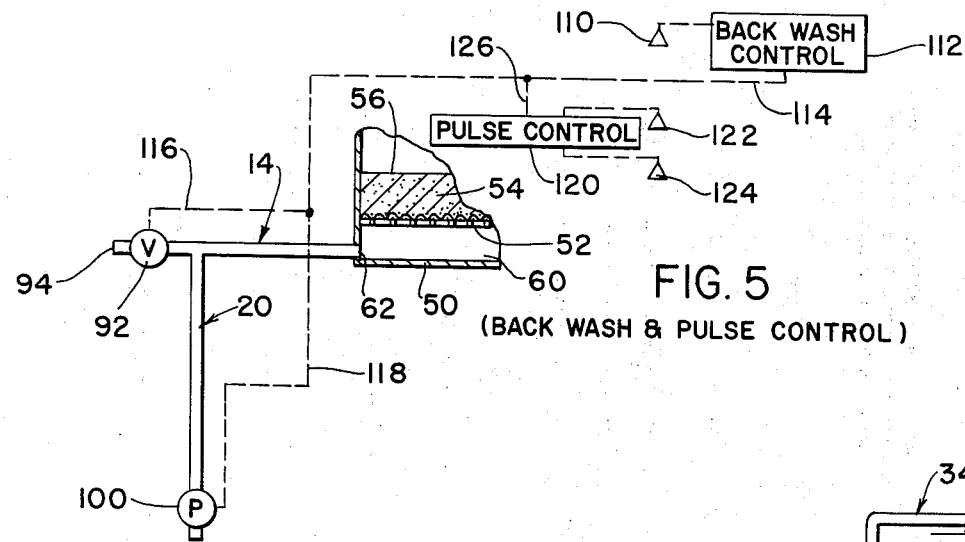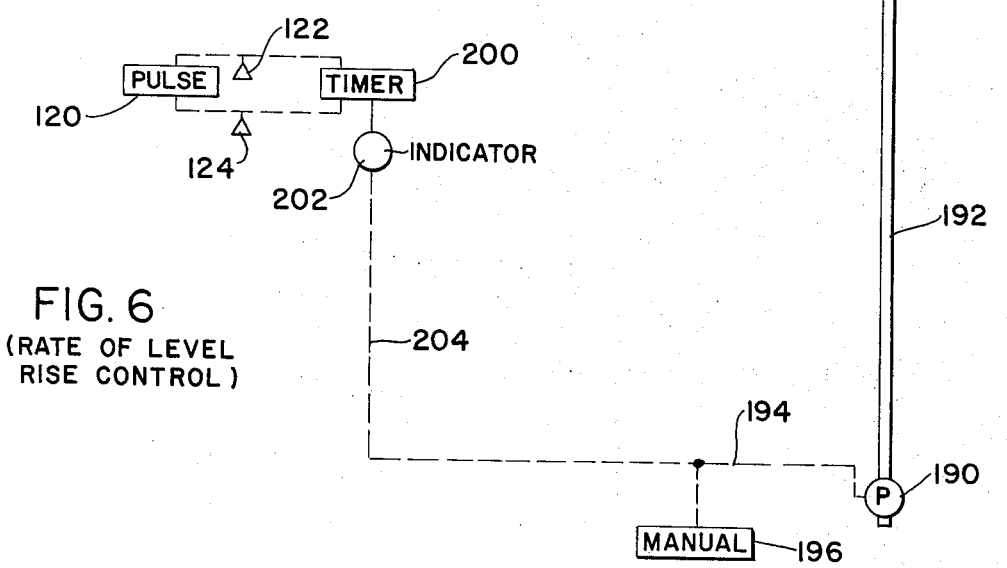

(COAGULATOR CONTROL)

APPARATUS AND METHOD FOR TREATING WASTE LIQUID

The present invention relates to the art of treating waste liquid effluent and more particularly to an apparatus and method for treating such effluent.

This invention is particularly adapted for use with a sand filter of the type disclosed in my U.S. Pat. No. 3,459,302 and it will be described with particular reference thereto; however, it must be appreciated that the invention has much broader applications and may be used in various waste liquid effluent apparatus wherein the filter is cleansed by a backwashing liquid.

The treatment of any waste water, whether by biological, physical or chemical means, or combinations thereof, results in a quantity of solid material that must be separated from the waste water. The separation, accumulation and the removal of these solids produced as an end product of the waste liquid treatment is one of the most difficult phases of all waste treatment processes. The failure of many systems to provide for adequate means to accomplish this phase of operation has resulted in the unbalancing of the process and the potential upsetting of the total waste treatment system.

Many prior systems of waste water treatment have attempted to solve, at least partially, the problem of separating solids and accumulating these solids by providing clarifiers and withdrawing the solids settled adjacent the bottom of the clarifier. The separated solids are then directed to holding tanks, digesters, or other vessels for further treatment and/or disposal. However, in all processes of waste water treatment where clarifiers are used for the separation of solids from liquids, the efficiency of the separation process can be easily reduced. Many factors, some completely beyond the ability of the operation of the system, or the system itself can affect the settleability of these solids. The suspended solids not removed by clarification are carried in the treated liquid to the receiving stream. These solids carried to the stream in the liquid waste are deleterious to the receiving bodies in varying degree. Suspended solids are not finite by character and may contain some substances that will impart a polluting load to the receiving body. The problem of pollution due to suspended solids carried over in the waste treatment processes has been recognized by authorities concerned with water pollution abatement for several years. The seriousness of this problem is further amplified, when one considers that various changes experienced in biological or chemical-physical processes may result in a loss of solids from the system. This loss is manifested by a high suspended solid characteristic in the treatment waste water coming from the sewage treatment system.

The importance and the effect of removing suspended solids from the treated waste water have long been understood. Many regulatory agencies have required that treated waste water be further treated either by filtration or in holding ponds in an effort to remove suspended solids carried over from the basic waste treatment system. These processes of removing suspended solids from treated waste effluent are generally known as tertiary processes. While the theory behind these tertiary processes for removing solids in the waste effluent coming from a secondary processing plant was reasonable, they were not found to be practical over long periods of use.

The suggestion to use a relatively small, rapid sand filter for tertiary treatment of the effluent coming from a secondary plant does not solve the problems associated with tertiary treatment. For example, the utilization of a media with an effective size of 0.45 mm and a high degree of uniformity, corresponding to a uniformity coefficient of 1.5 will create a situation wherein the filter will clog in a relatively short time under normal loading conditions from the secondary effluent. To cleanse the filter after clogging, the filtered effluent is collected and used as a clear water for backwashing. Rapid clogging of the sand filter will result in a deficiency in the clear filtered effluent so that there is not a sufficient quantity for the backwashing operation. Consequently, backwashing is impossible without introduction of additional clean water. To overcome this difficulty, it is necessary to increase the filtering run of a small sand filter for tertiary use so that only a small portion of the filtered effluent is required for the backwashing operation. The remaining filtered effluent is discharged into a receiving stream.

One technique for increasing the filter run would be to provide coagulation and separation of the suspended solids in the treated waste water prior to introduction of the waste water into the filtering device. Such a technique would require that the total flow from the sewage treatment plant be treated with a chemical and settled in a vessel appropriately dimensioned to accommodate total volume of effluent going into the filter. The resulting capital cost and the cost of continued use of chemicals would be substantial, if not prohibitive. Also, such a technique requires complex metering and chemical feed devices and frequent, periodic attention by the operator. The addition of chemicals increases the actual amount of suspended solids that must be removed.

In my U.S. Pat. No. 3,459,302 there is disclosed and claimed an arrangement for increasing the filtering run in a tertiary sand filter without the pretreatment described above. This arrangement has proven successful and is now widely used in the tertiary treatment of effluent coming from a secondary plant. In accordance with the disclosure in my prior patent, an arrangement is provided for creating uplifting currents above the sand filter surface which lifts large particles from the surface and increases the filtering run. During filtering, the filtered effluent is accumulated in a clear well, and a part of this filtered effluent is used for backwashing when the filter run has been completed and backwashing is required. The filtered effluent is pumped in a reverse direction through a sand filter and solids within the sand filter and on the surface of the filter are carried away into a mud well. Thereafter, a pump forces the backwashing liquid in the mud well back to the secondary treatment plant for additional processing. As previously stated, this tertiary treatment has proven satisfactory and is now widely used. Due to the high efficiency of a tertiary sand filter of the type disclosed in my U.S. Pat. No. 3,459,302, the backwashing liquid directed back into the secondary plant has a high concentration of suspended solids. In fact, the more efficiently the filter operates, the less often the filter is backwashed. Consequently, there is a higher concentration of suspended solids which are returned to the secondary sewage treatment plant for reprocessing. The returned solids load will be added to the sewage treatment plant solids and the total rate of solid accumulation will be accelerated. The accelerated growth of solids and accumulation of these solids place an additional burden on the plant operator. He must observe the rate of solids accumulation more carefully and withdraw solids far more frequently than prior experience had indicated was necessary. The suspended solids concentration within a waste water treatment process will vary with the type of process, and the withdrawal of solids will be no more efficient than that particular process will permit. For example, suspended solids concentration within a properly-loaded and operated extended aeration tank may vary from 4,000 to 6,000 mg/l or an average of 5,000 mg/l. This represents a solid concentration of only ½ of 1 percent. Therefore, for the operator to withdraw only 1 pound 200 pounds of admixture of solids and liquids, or 24 gallons of admixture for each pound of solids to be removed. If the operator were able to remove a more concentrated admixture of solids, for example, a concentration of only 1 percent solids, he would have to waste only 12 gallons of admixture to remove 1 pound of solids. Consequently, it is advisable to remove an admixture having the highest possible concentration of solids.

Filtration of the treated waste liquid from a secondary treatment plant will reduce suspended solids in the filtrate coming from the filter proportional to the effectiveness of the media utilized in the filter. Using media with a size of 0.45 mm and a uniformity of 1.5, the filtrate will contain approximately 5 mg/l of suspended solids. An example of suspended solids accumulation may be then calculated based upon the known characteristics of the secondary effluent coming through the filter. A high-quality secondary effluent may contain 25 mg/l suspended solids. 5 mg/l are retained in the filtrate coming from the filter. Consequently, the filter removes 20 mg/l. The retained solids from each 1,000 gallons of filtered treated waste liquid will contain:

$$(1,000)(20)(8.33)/10^c = 16.66/100 = 0.17 \text{ lbs}$$

Consequently, 17 lbs. of solids will be returned to the secondary treatment plant for each 100,000 gallons of treated waste effluent passing through the tertiary filter. By concentrations of ½ of 1 percent solids, approximately 400 gallons of additional waste solids will be accumulated for each 100,000 gallons of effluent passing through the filter. The introduction of this quantity of solids back to the secondary treatment plant forces the operator to maintain very careful control over the suspended solids level in the secondary plant. In most instances, heavy influx of suspended solids from the tertiary filtering device and the liquid carrying the solid overloads the secondary plant and unbalances the treatment device and contributes to the malfunction of the system.

In view of the above discussion regarding the general advantage of employing a tertiary filter of the type disclosed in my U.S. Pat. No. 3,459,302 and the importance of extracting suspended solids from the effluent being treated in the tertiary filter, it will be seen that the disadvantages resulting from high concentrations of suspended solids in the backwash liquid of a highly efficient tertiary sand filter are overcome by the present invention which relates to an apparatus and method for filtering waste effluent having an arrangement for reducing the load imposed upon the secondary plant during operation of the tertiary filter.

In accordance with the present invention there is provided an improvement in a waste liquid treatment system including a filter element having an inlet portion, an outlet portion and a filtering media between the inlet and outlet portions, means for directing a waste liquid through the filter elements in a direction from the inlet portion to the outlet portion to obtain a filtered effluent having a reduced suspended solid concentration, backwashing means for forcing a backwashing liquid from the filter element from the outlet portion to the inlet portion and means for receiving the backwash liquid after it has been used by being passed through the filter element. The improvement in the above filtering system includes the provision and means for concentrating solids in the used backwashing liquid to produce a supernatant with reduced solids content and means for passing the supernatant directly to the inlet portion of the filter for refiltering. In accordance with a more limited aspect of the present invention, the means for concentrating the solids includes means for coagulating the solids in the used backwashing liquid and means for settling the coagulated solids from the used backwash liquid to produce the supernatant prior to refiltering.

In accordance with another aspect of the present invention there is provided a method of treating waste effluent comprising the steps of filtering the effluent through a filter element to remove solids therefrom, backwashing the filter element to remove solids separated from the effluent by the filter element to create a backwashing liquid having previously filtered solids therein, concentrating these solids in the backwashing liquid to produce a supernatant having a lower solid content than the backwashing liquid, and refiltering the supernatant by passing it again through the filter element.

In accordance with a more limited aspect of the present invention, the concentrating step of the method as defined above includes the step of coagulating the solids in the backwashing liquid and settling out the coagulated solids.

By employing the invention as defined above, the filtering element can internally separate the solids removed during the filtering operation into a given concentration location wherein these solids can be subsequently removed by the removal of a liquid having a substantial concentration of solids. As previously described, handling of solids becomes more efficient as the concentration of the solids increases. This occurs in practicing the present invention. In accordance with another aspect of the present invention, the filtering element employed by the invention is a sand filter and there is provided means above the surface of the sand filter to create currents that lift larger particles of the surface of the filter. This concept is defined and claimed in my prior U.S. Pat. No. 3,459,302. In this manner, the filter has longer filter runs between subsequent backwashing. This will reduce the amount of backwashing liquid with respect to the solids being backwashed, and a higher concentration of solids in the backwash liquid will result. In accordance with a still further aspect of the invention, there is provided on the sand filter as mentioned above an arrangement for further increasing the filter run between backwashing by forcing a fluid upwardly through the sand filter intermittently during the filter run. This concept is defined and claimed in my co-pending application, Ser. No.

155,482, filed June 22, 1971. This concept further increases the amount of suspended solids in the backwashing liquid after the backwash cycle.

In the past, when employing tertiary sand filters, solids entrained within the backwashing liquid were directed to the secondary treatment plant and caused an increased solid load on the plant. Also, the liquid carrying the solids to the secondary plant could hydraulically overload the plant. With the present invention, the solids in the effluent coming from the secondary plant are separated at the filter and are not returned to the secondary plant for reprocessing. Also, no hydraulic load is imposed upon the secondary treatment plant by the sand filter. Consequently, the secondary plant will be capable of developing a natural level of solids based upon its own design characteristics and the degree of loading. The suspended solids are separated and concentrated at the filter and no resultant hydraulic or solid load is reintroduced into the secondary plant. The advantages of a system constructed in accordance with the present invention are, therefore, readily apparent.

The object of the present invention is the provision of a method and apparatus for filtering waste effluent issuing from a secondary plant, which method and apparatus do not reintroduce solids or liquids into the secondary plant.

Another object of the present invention is the provision of a method and apparatus for tertiary treatment of waste effluent issuing from the secondary plant, which method and apparatus remove solids from the backwash liquid of the filter.

Another object of the present invention is the provision of an apparatus and method as mentioned above, which method and apparatus employ coagulation and settlement of the backwash liquid.

Yet another object of the present invention is the provision of a method and apparatus for treatment of waste effluent issuing from a secondary plant, which method and apparatus employ coagulation and settlement of only a portion of the liquid passing through the apparatus.

These and other objects and advantages will become apparent from the following description taken together with the accompanying drawings in which:

FIG. 3 is a top elevational view taken generally along line 3—3 of FIG. 2;

FIG. 5 is a schematic view illustrating the backwash and pulse control of the preferred embodiment of the present invention;

FIG. 6 is a schematic view illustrating the rate of level rise control of the preferred embodiment of the present invention; and, FIG. 7 is a schematic view illustrating the coagulator control employed in the preferred embodiment of the present invention.

Figure 1:
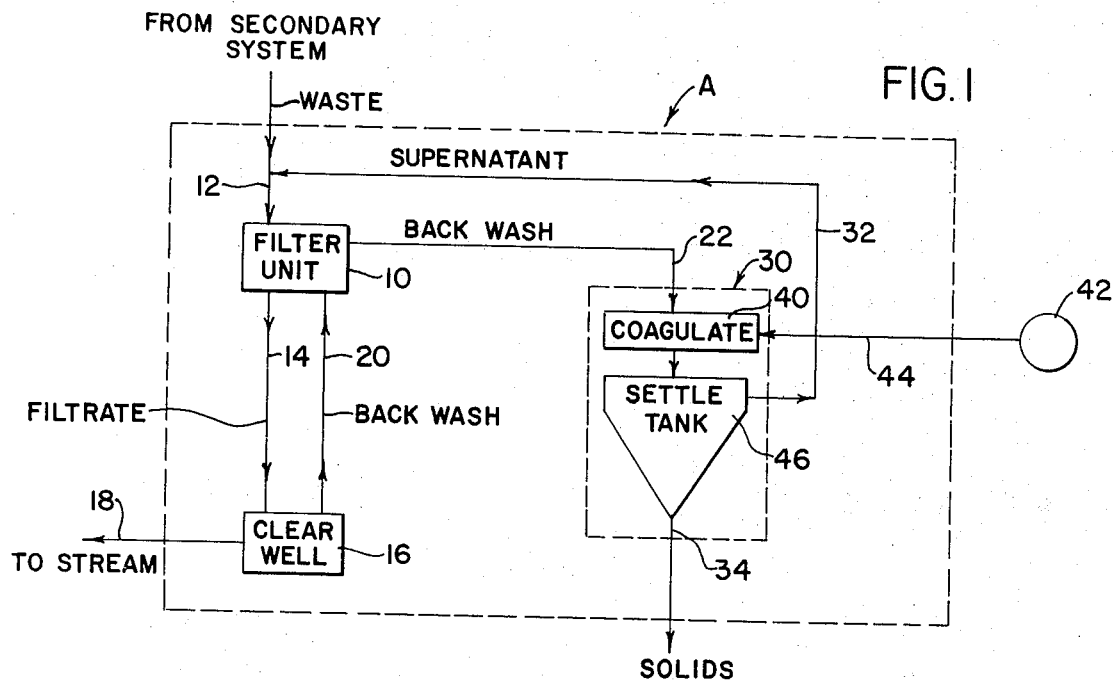
FIG. 1 is a schematic block diagram illustrating the present invention.
Figure 4:
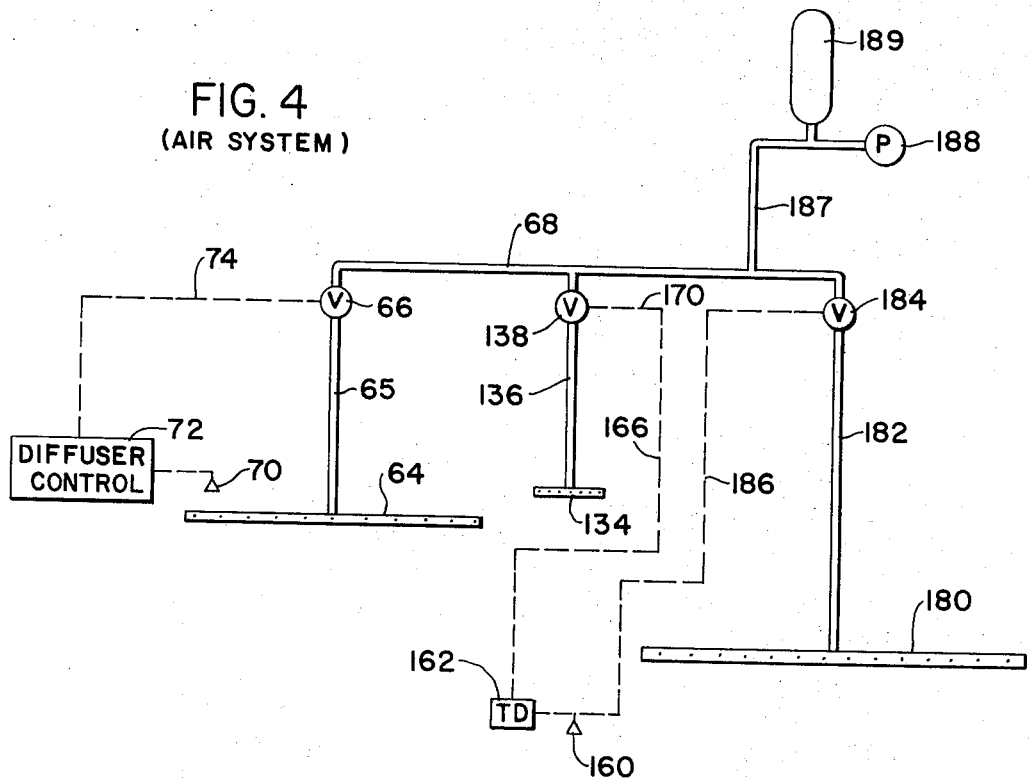
FIG. 4 is a schematic view illustrating the air system of the preferred embodiment of the present invention.

Referring now to the drawings wherein the showings are for the purpose of illustrating a preferred embodiment of the invention only, and not for the purpose of limiting same, FIG. 1 shows a schematic, block diagram of the present invention wherein a filter system A includes a filter element, or unit 10, having an inlet 12 connected directly to the outlet of the secondary sewage treatment plant and an outlet 14 connected to a clear well 16 for holding a supply of filtrate or filtered effluent. The clear well has an outlet 18 for directing the filtrate to a receiving stream or other body of water. In operation of the unit so far described, the secondary waste effluent enters the filter element 10 where suspended solids are removed to produce a relatively clean effluent. After a period of time, the filter unit becomes clogged with retained suspended solids. In accordance with standard principles, a portion of the filtrate from clear well 16 is pumped through backwash passage 20 into the filter in a direction reverse to the filtering direction. In this manner, solids removed from the waste effluent and accumulated at the inlet portion of the filter unit are removed and directed through backwash liquid conduit 22 to a solids concentrator 30. In this concentrator, the suspended solids removed from the filter are concentrated so that they separate out to produce a supernatant having a relatively low suspended solids content. The supernatant is directed through line 32 to the inlet portion 12 of filter unit 10. The concentrated solids are then removed from the concentrator 30 by conduit 34. This solid removal process can be done at any time when the accumulated solids build up to a level necessary for removal. In operation, the backwash liquid after having been concentrated to produce a supernatant having a relatively low solid content is directed back to the inlet of the filter unit and not to the secondary sewage treatment plant from which the waste effluent is being received. Consequently, there is no unbalance of the secondary treatment. By employing this invention, the tertiary filtering system A does not require reprocessing of the backwash liquid in the secondary sewage treatment plant.

In accordance with the invention, the solids concentrator 30 includes a coagulator tank or chamber 40, including both a mixing and reactor portion, into which there is introduced a coagulant of any known composition contained in coagulant supply 42 connected to the coagulant tank or chamber 40 by conduit 44. After the coagulant has been added to the backwash liquid and reacted therewith, the admixture of coagulant and backwash liquid is directed to a settlement tank 46 which allows for settlement of the coagulated solids and the production of an upper level supernatant. By displacement, the supernatant is directed through line 32 to the inlet 12 of filter 10. When the supernatant has a high level of suspended solids indicating an accumulation of solids within the filtering tank, or periodically, the solids from the filtering tank are pumped through line 34 to an appropriate depository for concentrated solids. The volume of concentrated solids is substantially reduced, and they are made up primarily of coagulated suspended solids with a relatively low volume of liquid.

Figure 2:
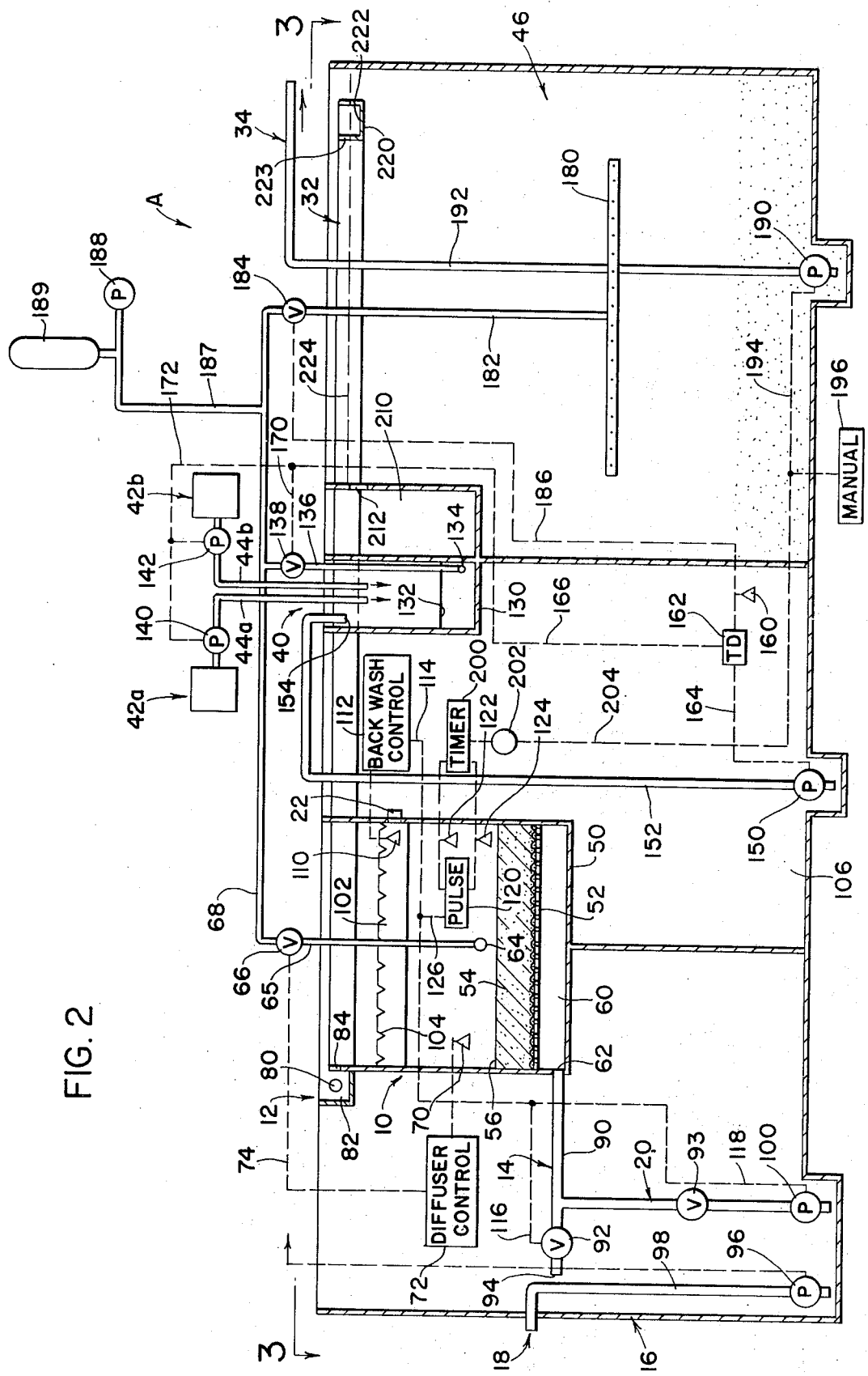
FIG. 2 is a schematic side elevational view of the preferred embodiment of the present invention.

Referring now to FIGS. 2–7, and more particularly FIGS. 2 and 3, there is schematically illustrated a preferred embodiment of the invention incorporating the concepts disclosed in FIG. 1 with the members from FIG. 1 being applied to the corresponding components of the remaining figures. The filter element 10 includes a tank 50 having a support structure 52 adjacent its bottom wall for supporting a layer of particulate media, such as quartz. The quartz layer has an upper surface 56 and defines a lower chamber 60 communicated with an effluent outlet opening 62. In accordance with the concept disclosed in my U.S. Pat. No. 3,459,302, the disclosure of which is incorporated by reference herein, the filter element includes a diffuser 64 connected by a line 65 with a valve 66 and from the valve to an air manifold 68. The diffuser serves the purpose of creating currents above the surface 56 for lifting large particles therefrom to substantially increase the filter run between successive backwashing of the layer 54. Within the tank 50 there is provided a level sensor 70 which takes a variety of forms. The sensor indicates the presence of liquid at the sensor to actuate a diffuser control 72 connected by line 74 with diffuser valve 66. Inlet 12, in the preferred embodiment, includes an opening 80 into which a waste effluent from a secondary system is introduced into a trough 82 having a weir 84. In operation, waste effluent enters trough 82 and overflows weir 84. From there, the waste effluent contacts the upper surface 56 and passes through the sand layer 54 where the suspended solids in the effluent are separated out and accumulate adjacent the uppermost section of the layer. As the filter becomes progressively clogged, effluent develops above surface 56 and as the level of this effluent increases, sensor 70 is actuated. When this happens, valve 66 is opened to introduce air from manifold 68 into the diffuser 64. This creates the currents which cause lifting of the particles from the surface 56 and increase the length of filter runs.

After being filtered, the effluent enters the lower passage 60 and is directed through the outlet 62 into a conduit 90. A valve 92 allows the filtered effluent to pass into the clear well 16 from which it is pumped through outlet 18 by pump 96 connected with conduit 98.

During backwashing, valve 92 is closed and valve 93 is opened. Filtered effluent in clear well 16 is then forced by a pump 100 through conduit 90, opening 62, passage 60, filter layer 54 and into a trough 102 having a plurality of longitudinally-spaced V-shaped notches 104. From the trough, the backwash liquid carrying the suspended solids filtered from the waste effluent by the filter unit is directed through conduit 22 into mud well 106. Of course, a valve can be provided within conduit 22 if the weir 84 is directly above the trough 102, or if it is otherwise desired. Within tank 50 and below the V-shaped notches 104 there is located a liquid level sensor 110 adapted to energize a backwash control 112. Actuation of this control directs a signal through lines 114, 116, 118 to close valve 92, open valve 93 and energize pump 100 for backwashing. This essentially describes the backwashing function; however, backwashing can be accomplished by other means besides a level sensing arrangement. In accordance with the illustrated embodiment of the invention, there is provided a pulse control 120 for forcing a fluid upwardly through the filtering media 54 during the filtering run and between successive backwashing. This arrangement increases the filtering runs and thus increases the concentration of suspended solids above the filter surface 56 before backwashing occurs. This concept is disclosed and claimed in my co-pending application, Ser. No. 155,482, filed June 22, 1971, which disclosure is hereby incorporated by reference for a more detailed disclosure. However, the disclosure in the figures of this application clearly indicates its operating characteristics. Sensors 122, 124 are vertically spaced a selected distance. If the liquid level rises above surface 56 at a sufficiently high rate, a relatively short time period will elapse between the liquid level reaching sensor 124 and the liquid level reaching sensor 122. When this occurs, the pulse control 120 sends a signal through line 126, connected to line 114, and causes valve 92 to close, valve 93 to open and the pump 100 to operate for a relatively short period of time. This traps air and compresses the trapped air within passage 60 and forces the air upwardly through the filter layer 54 to dislodge solids from the area of the filter adjacent surface 56. So far, the operation of the filter has been basically the same as certain concepts disclosed in my prior U.S. Pat. No. 3,459,302 and my co-pending patent application, Ser. No. 155,482, filed June 22, 1971.

In accordance with the present invention, the coagulator tank or chamber 40 is provided with means for introducing a coagulating substance into the chamber and means for mixing the coagulant with the backwash effluent. These two means can take a variety of structural forms; however, in accordance with the illustrated embodiment of the invention, the chamber 40 includes a mixing tank 130 having a lower opening 132. A mixing device 134, in the form of an air diffuser, is connected by a line 136 with valve 138 communicated, in turn, with manifold 68. In practice, a single appropriate coagulant well known in the sewage treatment art can be used to remove suspended solids from the backwash effluent; however, in accordance with the illustrated embodiment of the invention, it is proposed to provide a dual coagulant system wherein a coagulant supply tank 42a is filled with an alkaline-type of coagulant, such as sodium aluminate. An adjacent coagulant supply tank 42b is filled with an appropriate acidic coagulant, such as aluminum sulfate. These respective coagulants provide an alkaline or acidic addition to the backwash liquid and may be used separately or together to change or maintain a selected pH for the backwash liquid. This can be done by varying the quantities of the specific coagulant pumped by pumps 140, 142 into mixing tank 130 through lines 44a, 44b, respectively. Backwash liquid from mud well 106 has a concentration of suspended solids and is pumped into the mixing tank 130 by an extracting pump 150 forming a means for transporting the backwash liquid in the mixing tank through a line 152 having an outlet 154. In accordance with one aspect of the invention, the operation of the elements within the coagulator 40 is controlled or paced by the operation of the pump 150. This is accomplished, in accordance with the illustrated embodiment of the invention, by a liquid level sensor 160 which is connected to a time delay 162 including a first outlet line 164 for actuating pump 150 and a second outlet line 166 having a first branch 170 for actuating valve 138 and a second branch 172 for actuating pump 140, 142. When the liquid within tank 106 reaches the level of sensor 160, there is an indication that backwashing has occurred. A signal is then directed to the time delay device 162 which causes a certain lapse of time before the pump 150, valve 138, and pumps 140, 142 are actuated. They are all actuated at the same time so that the backwash effluent and coagulant are introduced into mixing tank 130 and the air diffuser 134 is actuated to cause a mixing of the substances. During the mixing operation, the backwash effluent with a coagulant mixed therewith passes out opening 132 into a liquid passage arrangement to be described later.

Referring now to the settlement tank 46, the tank includes a means for introducing oxygen for any residual biological demand of the effluent within the tank. This oxygen-supplying device may take a variety of forms, such as an air diffuser 180 having an input line 182 connected to a valve 184. This valve is, in turn, controlled by a line 186 directly coupled with level sensor 160. Consequently, when the level within mud well 106 reaches the sensor 160, diffuser 180 is turned off and the tank 46 becomes quiescent to allow settlement of the coagulated solid preparatatory to receiving the next influx of backwash liquid. Also within the settling tank 46, there may be provided a lower pump 190 connected by conduit 192 for directing concentrated suspended solids from the bottom of the settling tank to the removal line 34.

In accordance with the invention, pump 190 can be operated by various control arrangements. In accordance with the illustrated embodiment, pump 190 is actuated by a signal received through line 194 coupled with a manual control 196 and an automatic control 200. This control 200 takes the form of a rate of rise timer coupled with sensors 122, 124 to register a rapid increase in the level of effluent above surface 56. This control arrangement for the pump 190 is best illustrated in FIG. 6. When the time between the level of liquid reaching sensor 124 and sensor 122 is relatively small, indicating an influx of effluent having a high level of suspended solids, the timer 200 actuates indicator 202. This can be a visual indicator or can automatically control the pump through a line 104. In this manner, the pump 190 is actuated when there is rapid rise in the liquid level above filter surface 56. Alternatively, the pump may be manually operated by control 196 on a periodic basis or when the indicator 202 is actuated. Basically, the out-pumping of concentrated solids from the settlement tank 46 is effected in any manner to maintain a properly operating clarifier.

Figure 7:
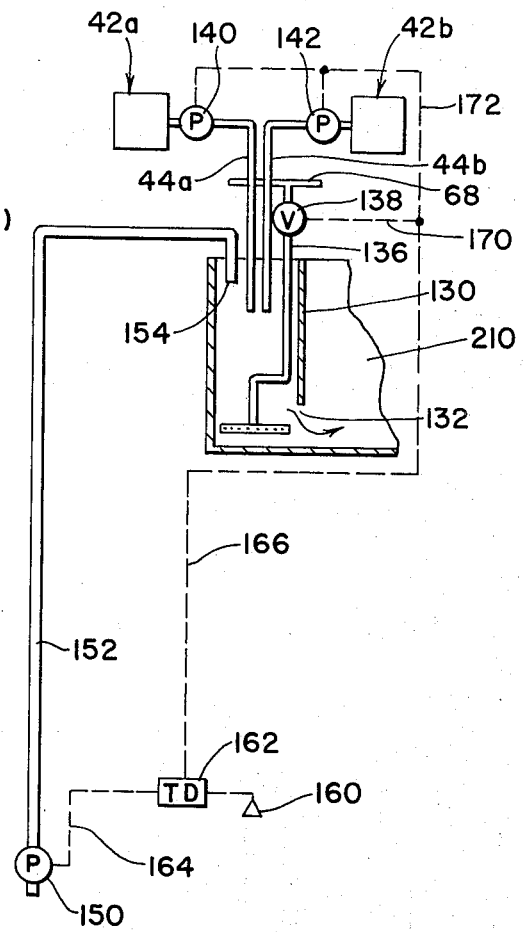

Referring now to FIG. 7 which discloses the coagulator control, the effluent mixed within tank 130 exits from opening 132. This opening is communicated to a reactor chamber 210 as shown in FIGS. 2 and 3 and having a center baffle 211. The baffle 211 increases the retention time within chamber 210; however, this baffle can be removed if the retention time in chamber 210 is sufficient to allow reaction of the coagulant with the solids. While in the reactor chamber, the coagulant effects coagulation of the suspended solids within the backwash liquid. Openings 212 allow the backwash liquid to overflow into the clarifier or settling tank 46 adjacent one edge of the tank. When the pump is again energized, the incoming liquid from outlet 154 forces the reacted liquid from the opening 212 where it is introduced into tank 46. Adjacent the upper portion of tank 46 there is provided a trough 220 extending from the tank to the inlet trough 82 so that supernatant accumulated at the upper portion of the settlement tank and having a relatively low level of suspended solids is redirected to the filter element 10. Trough 220 has a first portion 222 extending along one end of tank 46 opposite to the outlets 212 so that the liquid entering the tank 46 from the outlets is allowed to flow downwardly into the tank thus displacing the supernatant and causing it to overflow into trough 220 through weirs 223.

Having thus described my invention, I claim:

1. In a waste liquid treatment system including a filter element having an inlet portion, an outlet portion and a filtering media between said inlet and outlet portions; means for directing a waste liquid through said filter element in a direction from said inlet portion to said outlet portion to obtain a filtered effluent having a reduced suspended solid concentration; backwashing means for forcing a backwashing liquid through said filter element from said outlet portion to said inlet portion; and means for receiving said backwashing liquid after it has been used by being passed through said filter element, the improvement comprising: means for concentrating the solids in said used backwashing liquid separately from said waste liquid to produce a clarified liquid formed essentially from said used backwashing liquid and having a reduced solids content and means for passing said clarified liquid to said inlet portion of said filter element for refiltering.

2. The improvement as defined in claim 1 wherein said concentrating means includes means for coagulating solids in said used backwashing liquid and means for settling said coagulated solids from said used backwashing liquid to produce said clarified liquid.

3. The improvement as defined in claim 2 wherein said coagulating means comprises a first tank adjacent said filter elements, means for directing said used backwashing liquid into said first tank, and means for introducing a coagulant into said first tank.

4. The improvement as defined in claim 3 including means in said first tank for mixing said coagulant and said used backwashing liquid.

5. The improvement as defined in claim 4 wherein said mixing means is an air diffuser in said first tank.

6. The improvement as defined in claim 4 including means for selectively actuating said mixing means.

7. The improvement as defined in claim 3 wherein said coagulant introducing means includes a first supply of a first coagulant, means connected to said first supply for directing said first coagulant to said first tank, a second supply of a second coagulant, and means connected to said second supply for directing said second coagulant to said first tank.

8. The improvement as defined in claim 3 wherein said first tank includes an outlet means for directing coagulant and used backwashing liquid from said first tank and including a second tank means for receiving said coagulant and used backwashing liquid, said second tank means being a settlement tank.

9. The improvement as defined in claim 8 wherein said settlement tank includes means for introducing oxygen into said settlement tank.

10. The improvement as defined in claim 9 wherein said oxygen introduction means includes an air diffuser in said settlement tank.

11. The improvement as defined in claim 10 including means for selectively operating said diffuser.

12. The improvement as defined in claim 1 wherein said filter element is a layer of particulate matter having an upper surface forming said inlet portion and a lower portion forming said outlet portion.

13. In a waste liquid treatment system including a first tank means having a lower portion; a filter element in said first tank means and adjacent said lower portion, said filter element comprising a layer of particulate material having an upper surface and an outlet passage generally below said layer; an outlet conduit means connected to said passage; second tank means communicated with said outlet conduit means for receiving filtered effluent from said passage; an effluent inlet above said surface; a backwash conduit means in said first tank means; third tank means communicated with said backwash conduit means for receiving backwash liquid from said backwash conduit means; and, backwashing means for selectively forcing filtered effluent from said second tank means, through said outlet conduit means, through said outlet passage, through said filter element, through said backwash conduit means, and into said third tank means, the improvement comprising: means for removing solids from said backwash liquid to produce a clear liquid formed essentially of said backwash liquid and having less suspended solids and means for directing said clear liquid to said first tank means above said surface.

14. The improvement as defined in claim 13 including a means for creating currents above said surface for lifting solid accumulated thereon.

15. The improvement as defined in claim 14 wherein said current creating means includes an air diffuser above said surface.

16. The improvement as defined in claim 14 including means for selectively actuating said current creating means.

17. The improvement as defined in claim 16 wherein said actuating means includes means for sensing a level of effluent above said surface.

18. The improvement as defined in claim 13 including means for forcing fluid upwardly from said passage through said filter and means for actuating said fluid forcing means for relatively short periods.

19. The improvement as defined in claim 18 wherein said actuating means includes means for sensing the rate of rise of effluent level above said surface.

20. The improvement as defined in claim 13 including indicator means for indicating a rate of rise of effluent above said surface exceeding a preselected rate of rise.

21. The improvement as defined in claim 20 including a fourth tank means for receiving said removed solids and means responsive to said indicator means for removing solids from said fourth tank means.

22. The improvement as defined in claim 13 wherein said solids removing means includes means for coagulating solids from said backwash liquid and means for settling out said coagulated solids.

23. The improvement as defined in claim 22 wherein said coagulating means includes a fourth tank means, means for directing said backwash liquid from said third tank means to said fourth tank means and means for introducing a coagulant into said fourth tank means.

24. The improvement as defined in claim 23 including means in said fourth tank means for mixing said coagulant and said backwash liquid.

25. The improvement as defined in claim 24 wherein said mixing means is an air diffuser.

26. The improvement as defined in claim 25 including means for selectively actuating said mixing means.

27. The improvement as defined in claim 22 wherein said settling means includes a settlement tank.

28. The improvement as defined in claim 27 including means in said settlement tank for pumping solids therefrom.

29. The improvement as defined in claim 27 including means for introducing oxygen into said settlement tank.

30. The improvement as defined in claim 29 wherein said oxygen introducing means includes an air diffuser in said settlement tank.

31. The improvement as defined in claim 22 wherein said settling means is a settlement tank adjacent said third tank means and said means for directing clear liquid to said first tank means is a conduit extending from said settlement tank to said first tank means.

32. The improvement as defined in claim 31 wherein said first, second, and third tank means are secured together as a unit.

33. The improvement as defined in claim 32 wherein said settlement tank is secured to said unit.

34. The improvement as defined in claim 22 wherein said coagulating means includes a coagulant tank and means for introducing a coagulant into said coagulant tank, and including means for forcing said backwash liquid into said coagulant tank.

35. The improvement as defined in claim 34 including means for sensing backwash liquid level in said third tank means and means responsive to said sensing means for actuating said coagulant introduction means and said forcing means.

36. The improvement as defined in claim 35 wherein said settling means includes a settlement tank and including means for introducing oxygen into said settlement tank and means responsive to said sensing means for deactivating said oxygen introducing means while said forcing means is actuated.

37. A method of treating waste effluent comprising the steps of:
 a. filtering said effluent through a filter element having an inlet portion to remove solids therefrom;
 b. backwashing said filter element to remove solids separated from said effluent by said filter element to create a backwash liquid having previously filtered solids therein;
 c. coagulating only said solids in said backwash liquid;
 d. separating out at least a portion of said coagulated solids to form a clear liquid formed essentially from said backwash liquid of reduced suspended solid content;
 e. passing said clear liquid to the inlet portion of said filter element without prior coagulation of said backwash liquid and said effluent jointly; and,
 f. filtering said clear backwash liquid and effluent by said filter element.

38. The method as defined in claim 37 including the additional step of extracting said settled solids.

39. the method as defined in claim 37 including the additional step of creating currents adjacent said filter elements to remove solids from said element during said filtering step.

40. A method of treating waste effluent coming from a treatment plant comprising the steps of:
 a. filtering said effluent through a filter bed to remove solids therefrom;
 b. backwashing said filter bed to remove solids separated from said effluent by said filter bed to create a backwashing liquid having previously filtered solids therein;
 c. concentrating said solids in said backwashing liquid separately from said effluent to produce a supernatant made up essentially of said backwashing liquid having a lower solids content than said backwashing liquid;

d. passing said supernatant directly to a position between said treatment plant and said filter bed; and, e. refiltering said supernatant by passing it through the same filter bed.

41. The method as defined in claim 40 including the step of retaining said backwashing liquid during said concentrating step.

42. The method as defined in claim 40 wherein said concentrating step includes the steps of coagulating said solids in said backwashing liquid and settling out said coagulated solids.

43. A filtering device for removing solids from a waste liquid effluent coming from a treatment plant, said device comprising: means for intercepting and removing solids from said effluent; means for washing these intercepted solids into a holding tank as an admixture of such solids and backwashing liquid; means for coagulating said solids in said admixture separately from said waste liquid effluent coming from said treatment plant; means for passing said admixture and coagulated solids to a settling tank wherein said solids settle to profuce an upper supernatant of reduced solids content; an overflow means in said settling tank for directing said supernatant to said intercepting and removal means.

44. A filtering device as defined in claim 43 wherein said overflow means includes a conduit extending from said settling tank to a position adjacent said intercepting and removal means.

* * * * *